United States Patent [19]

Pomerance et al.

[11] 3,836,175
[45] Sept. 17, 1974

[54] BICYCLE FOR TWO

[76] Inventors: Joseph B. Pomerance, 125 Vista Ln., Miami, Fla. 33156; Jesse Haywood Burke, 3650 Ashford-Dwd'y Rd. N.E. Apt. 6J, Atlanta, Ga. 30319

[22] Filed: Dec. 13, 1972

[21] Appl. No.: 314,730

[52] U.S. Cl. ............................................. 280/209
[51] Int. Cl. ........................................... B62k 13/06
[58] Field of Search .......................... 280/209, 7.16

[56] References Cited
UNITED STATES PATENTS

| | | | |
|---|---|---|---|
| 453,713 | 6/1891 | Riess | 280/209 |
| 565,443 | 8/1896 | Eells | 280/209 |
| 616,407 | 12/1898 | Cottrell et al. | 280/209 |
| 1,522,039 | 1/1925 | Swearinger | 280/209 |
| 2,694,582 | 11/1954 | Reside | 280/209 |
| 3,592,486 | 7/1971 | Fox | 280/209 |

*Primary Examiner*—Kenneth H. Betts

[57] ABSTRACT

An attachment means for interconnecting two bicycles of similar size in side-by-side relation, of either a man or woman's design, which is composed of a plurality of lateral rigid rods and connections of the rods to the frames of the bicycles through hinge means at the rear compensating for relative vertical displacement of the bicycles through a hinge type action, which includes shock absorber means, and ball and socket means on the rigid bars interconnecting the forward end of the bicycle frames and steering columns of the bicycles.

7 Claims, 9 Drawing Figures

PATENTED SEP 17 1974 3,836,175

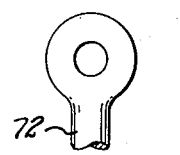
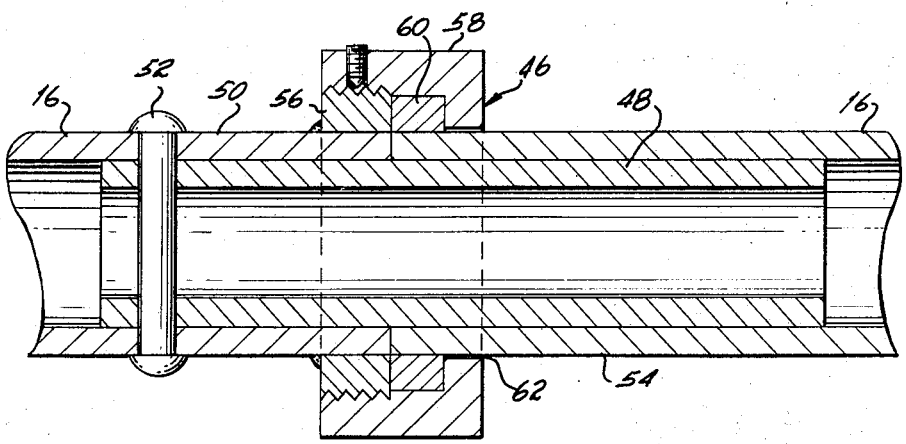
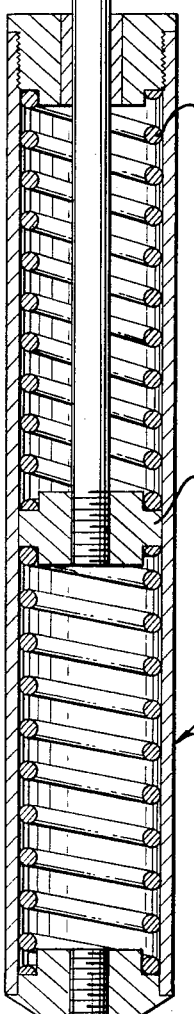
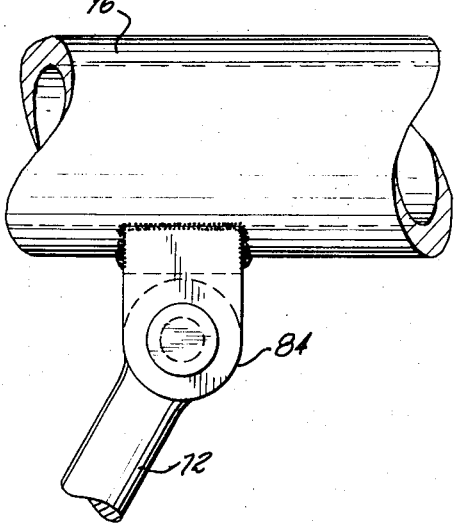
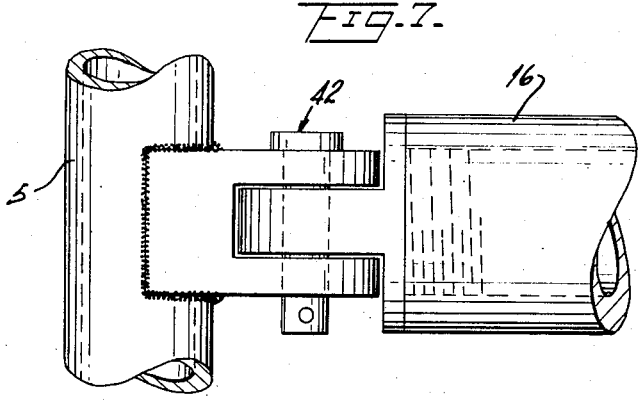

3,836,175

BICYCLE FOR TWO

FIELD OF THE INVENTION

This invention relates to a means for connecting a pair of bicycles together so that they can be ridden as a pair by two persons, one on each bicycle.

BACKGROUND OF THE INVENTION

Bicycles built for two have been well known in which one person rides behind the other; however, there are certain disadvantages with such equipment because one of the riders may not want to peddle as fast as the other or may feel uncomfortable for one reason or another with such a seating arrangement. The present invention provides means for connecting two bicycles together so that the riders will ride side by side. The means to attach the bicycles provides for independent action of the separate bicycles, can be used to connect a pair of bicycles together, and provides for relatively independent action of the two bicycles when they are connected together through a plurality of bars laterally spanning and maintaining the bicycles at a predetermined distance from one another, the bars being connected to the bicycle frames through hinge and ball joint mean so that turns and uneveness of the roadway may be negotiated readily, as will be described more fully hereinafter.

The invention offers the advantage of quick attachment and removal of the connections by hand without the use of tools so that the bicycles can be more easily transported or used as single units. The connections in no way interfere with the use of various drive gear mechanism or brake systems in common use. The connections where applicable allow free hinge and rotary movement preventing any stress on the connectors, connections and frames caused by the independent vertical movement of wheels over bumps and the leaning on curves to counterbalance centrifugal force on the riders when making turns. The double spring loaded struts connect the bicycle frames and maintain the bicycles in a vertical position when standing or moving in a straight direction and allows the bicycles to lean when turning as would be the case when a single rider makes a turn. A bar connects the front wheel forks at their hubs maintaining the wheels in a parallel position and causing them to move in unison when one or both handlebars are turned.

Accordingly, it is an object of the present invention to provide attachments for a pair of like size bicycles that will maintain them in a parallel, vertical, but flexible, position allowing two people to ride side by side in comfort and safety over smooth or bumpy trails, although one rider may be incapable of operating a single bicycle.

In accordance with these and other objects which will become apparent hereinafter, the instant invention will now be described with reference to the accompanying drawings in which:

DESCRIPTION OF THE DRAWINGS

FIG. 4 is a view in cross section taken along the plane indicated by the line 4—4 of FIG. 1 and looking in the direction of the arrows;

FIG. 5 is a view in cross section of that portion of FIG. 2 indicated by the line 5—5 and looking in the direction of the arrows;

FIG. 6 is a view in cross section of that portion of FIG. 1 indicated by the line 6—6 therearound;

FIG. 7 is a view in cross section of that portion of FIG. 2 indicated by the arrowed line 7—7 therearound;

DETAILED DESCRIPTION OF THE DRAWINGS

Figure 1:
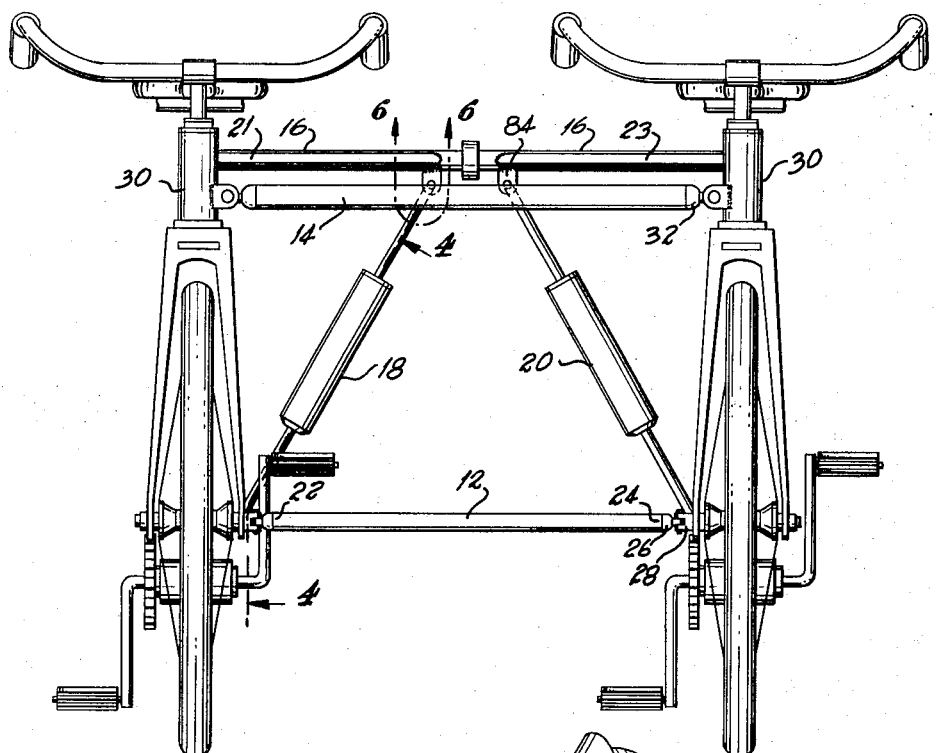
FIG. 1 is a front elevation view of a pair of bicycles interconnected with the connecting means of the instant invention.
Figure 8:
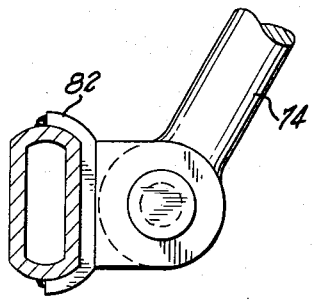
FIG. 8 is a view in cross section taken along the plane indicated by the line 8—8 of FIG. 3.

Referring to the drawings, wherein like reference characters designate like or corresponding parts throughout the several views, a preferred embodiment of the attachment means for connecting a pair of generally similar sized bicycles is shown.

Figure 3:
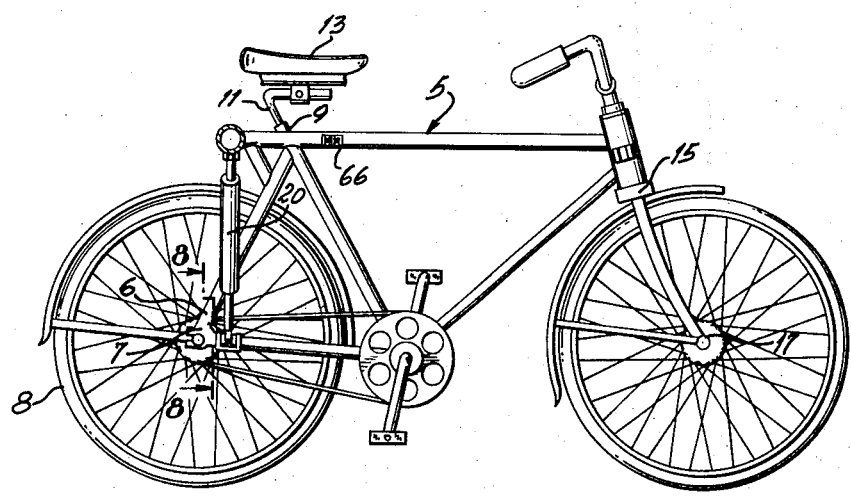
FIG. 3 is a view in cross section taken along the plane indicated by the line 3—3 of FIG. 2 and looking in the direction of the arrows.

As best seen in FIG. 3, each of the bicycles, as is conventional, includes *a*) a frame 5, 1) with a lower rear bifurcated portion 6 having a lateral socket means 7 to receive the axle of a rear bicycle wheel 8, and 2) a sleeve 9 at the rear portion of the upper frame member to receive the male stem 11 of a bicycle seat 13, and *b*) a bifurcated steering column 15 with lateral socket means 17 to receive the axle of a forward bicycle wheel.

The attachment means comprises generally a plurality of lateral bars of an overall length of between about 1 ½ feet to 3 feet, including, a pair of forward rigid bars, one being a lower rigid bar 12 and the other being an upper rigid bar 14 and, additionally, an upper rear bar 16 having a pair of downwardly diverging struts 18 and 20 and a pair of forwardly diverging struts 21 and 23.

Figure 2:
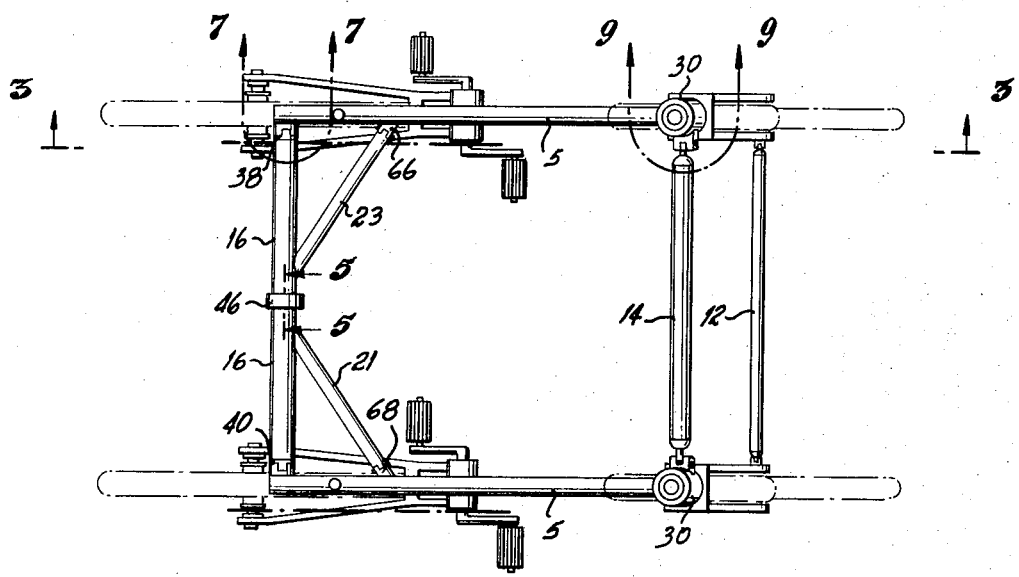
FIG. 2 is a plan view of FIG. 1.

Referring first to the lower forward rigid bar 12, this bar connects the bifurcated steering columns of a pair of bicycles at the associated socket means indicated by the numeral 17 in FIG. 3, as is also illustrated in FIGS. 1 and 2. Means are provided to connect the bar at each of its ends 22 and 24 to the bifurcated portion of the steering column. In the preferred embodiment, there is provided on each end of the bar 12 a ball and socket-connecting means 26 similar to that shown in FIG. 9, the ball having an extending stem which is pivotally connected as at 28 in FIG. 1 in a clevis connection to the axle zone of the bifurcated steering column, so as to be pivotal about a vertical axis.

Figure 9:
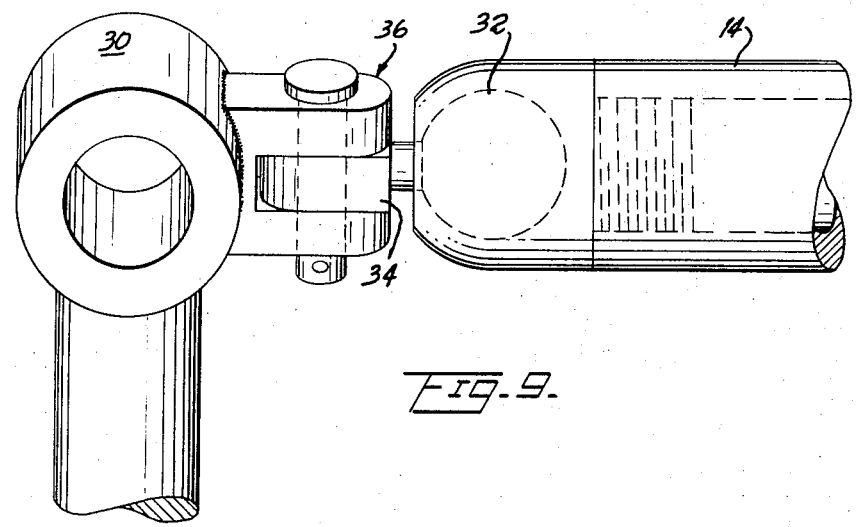
FIG. 9 is a view in cross section of that portion of FIG. 2 indicated by the line 9—9.

With continuing reference to FIGS. 1 and 2, the upper forward rigid bar 14 is connected at its opposite ends to each of the bicycles at the sleeve 30 of the frame which accommodates the steering column. The means to connect this bar is shown in FIG. 9.

It is seen that it includes a ball and socket means 32, the balls at either end of the rod being captivated in the sockets and each ball including an axially-projecting stem 34 connected in a clevis connection 36, the yoke of which may be welded or otherwise suitably connected to the frame 5.

The rear bar 16 connects at its opposite ends to the bicycle frame at about, but preferably slightly rearwardly, of the bicycle seat connection to the frame. The means to connect 38 and 40 is illustrated in FIG. 7 and is seen to include a clevis arrangement with respect to a pivot pin 42 having a longitudinal axis. The rear bar 16 comprises a pair of members interconnected in a connection 46, see FIG. 5, which permits of relative rotation of the members about their common longitudinal axes. The connection 46 includes a stud 48 telescoped into the end of that member designated by the numeral 50 and secured therein as by the pin 52 with the other member 54 being telescopically positioned over the stud. To the member 50 an externally threaded bushing 56 is secured which is adapted to mate with a cup-shaped keeper 58 and ring 60 secured on the member 54 so that by threaded advancement of the cup-shaped member the members are joined together with the opening 62 and the cup-shaped member being loosely fitted so as to permit of the relative rotation. The rear bar further includes the pair of struts 21 and 23 which diverge in a forward direction from the central zone outwardly to connect the clevis connections 66 and 68 to the frame, through a yoke as indicated. Also, from the central zone of the rear bar 16 there are provided a pair of downwardly diverging shock absorbing struts, as previously referred to, the same being designated by the numerals 18 and 20 as seen in FIG. 1, and shown in detail in FIG. 4. The extending ends 72 and 74 of the shock absorbing struts are connected in a shock absorbing cylinder 76, one of the members designated by the numeral 72 having a piston 78 on the inner end of a cylinder and biased as by the spring 80 to a normal position, yet yieldable to accommodate unevenness of the roadway. The extending ends of the shock absorbing struts are secured to the frame as at 82 in a clevis arrangement and similarly to the rear upper bar 84.

It is thus seen that through the forward bars and their ball and socket connection to the frame, there is provided means for compensating movement of adjustment to accommodate an uneven roadway, these connections providing both hinge and rotary movement, while, at the rear, the connection of the rear bar and struts provide for hinge movement of elevation of one of the bicycles relative to the other to compensate for uneven road movement with the shock absorbing struts permitting independent movement of each bicycle wheel without strain on the connections of bicycle frames.

What is claimed is:

1. An attachment means to connect together two bicycles of similar size which are of the type which include a frame with a rear wheel axle socket below and rearwardly of a rider's seat and a forward steering column journaled to the frame which is bifurcated and includes an axle socket, said means to connect including an upper and lower rigid bar, each having a ball and socket means at its opposite ends, the lower bar connecting the bifurcated steering column of the bicycle and the upper bar connecting the portion of the frame in which the steering column is journaled, and bar means having a longitudinal centerline extending transversely of the frames and adapted to connect the rear portion of the frames to space the rear portions of the frames apart at a predetermined distance equal to the distance of said upper and lower rigid bar and ball and socket means and said bar means having relatively movable portions yieldable to torque about the centerline and including hinge means connecting one of the ends of the rear bar means to each of the bicycle frames for relative swinging movement of each bicycle about a front to rear axis.

2. The attachment means as set forth in claim 1 wherein the rear bar portions comprise two mating segments rotatable with respect to one another about their common axis and means to maintain the mating segments in interconnected relation.

3. The attachment means as set forth in claim 2 wherein a pair of stabilizing struts are provided rigidly connected to the central zone of the rear bar means and each strut having means to connect to the bicycle frame comprising clevis means having an axis in the horizontal plane perpendicular to the longitudinal axis of the rear bar means.

4. The attachment means as set forth in claim 2 wherein the means to maintain the segments in interconnected relation comprise an annular member on one of the segments with a threaded exterior and a cup-shaped member on the other of the segments in threaded engagement with the segment having the annular member and an extension rigidly secured to the bar extending to each of the segments, the cup-shaped member having a through bore for rotatably receiving the bar portions therethrough.

5. The attachment means as set forth in claim 2 wherein the rear bar means is provided with shock absorbing struts interconnecting the lower portion of the bicycle frame and the rear bar means.

6. The attachment means as set forth in claim 5 wherein the shock absorbing means comprises a cylinder intermediate the length of the shock absorbing strut and spring means in the cylinder, said struts being composed of two segments, the confronting ends of which bear against the spring means.

7. The attachment means as set forth in claim 1 wherein a pair of stabilizing struts are provided rigidly connected to the central zone of the rear bar means and each strut having means to connect the bicycle frame comprising clevis means having an axis in the horizontal plane perpendicular to the longitudinal axis of the rear bar.

* * * * *